US006816582B2

(12) United States Patent
Levine et al.

(10) Patent No.: US 6,816,582 B2
(45) Date of Patent: Nov. 9, 2004

(54) AUTOMATICALLY SIMULTANEOUSLY RINGING ALTERNATIVE TELEPHONE NUMBERS

(75) Inventors: David A. Levine, Atlanta, GA (US); Gregory N. Patterson, Atlanta, GA (US); James A. Worsham, Buford, GA (US); Z. Zeeman Zhang, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 09/966,338

(22) Filed: Sep. 28, 2001

(65) Prior Publication Data

US 2003/0063733 A1 Apr. 3, 2003

(51) Int. Cl.[7] .......................... H04M 3/42; H04L 12/66; H04Q 7/20
(52) U.S. Cl. ............... 379/211.04; 379/202.01; 370/352; 455/422.1
(58) Field of Search .................. 379/202.01, 211.04; 370/352; 455/445, 422.1

(56) References Cited

U.S. PATENT DOCUMENTS

| 5,206,901 | A | * | 4/1993 | Harlow et al. | 379/211.04 |
|---|---|---|---|---|---|
| 5,502,762 | A | * | 3/1996 | Andrew et al. | 379/202.01 |
| 5,664,005 | A | * | 9/1997 | Emery et al. | 455/422.1 |
| 5,890,064 | A | * | 3/1999 | Widergen et al. | 455/445 |
| 5,956,631 | A | | 9/1999 | Gerszberg et al. | 455/403 |
| 6,337,857 | B1 | * | 1/2002 | Booton | 370/352 |

* cited by examiner

Primary Examiner—Harry S. Hong
Assistant Examiner—Thjuan P Knowlin
(74) Attorney, Agent, or Firm—Merchant & Gould

(57) ABSTRACT

A Service Control Point (SCP) has a call list associated with the main telephone number of a called party. When a calling party attempts to contact the called party by calling the main number, a Service Switching Point (SSP) or a Mobile Switching Center (MSC) fires a trigger. The trigger causes the SCP to access the call list and to cause the SSP/MSC to simultaneously ring the main (called) telephone number and at least one alternative telephone number associated with the main telephone number. A simultaneous ring service subscriber can remotely access the SCP to modify a call list, to add or delete a call list and to select an active call list. When a subscriber has multiple call lists, the subscriber can set account parameters to automatically select the active call list, based on various call factors, such as call time and calling party.

20 Claims, 5 Drawing Sheets

AUTOMATICALLY SIMULTANEOUSLY RINGING ALTERNATIVE TELEPHONE NUMBERS

FIELD OF THE INVENTION

The present invention generally relates to providing a telephonic connection between a calling party and a called party. More particularly, the present invention relates to attempting to connect the calling party to the called party by simultaneously ringing numbers in an alternative number list associated with a main number of the called party.

BACKGROUND OF THE INVENTION

The popularity of the cellular telephone evidences the fact that modern telephone users desire to be reachable to calling parties without being restricted by physical location. Before cellular telephones were so widely available, telephone users in many areas could subscribe to a call forwarding service from their local telephone service provider. Conventional call forwarding could be used to associate the subscriber's main number with an alternative number. When a calling party attempted to reach the subscriber, while the call forwarding service was activated, the alternative number would be rung, instead of the main number. Thus, a subscriber could enjoy the freedom to change its physical location, while maintaining some limited ability to receive calls that where actually made to the user's main number. The subscriber could typically forward incoming calls to any other telephone number.

Unfortunately, conventional call forwarding suffered from various shortcomings. First, call forwarding is exclusive, in that when the call forwarding service is activated, all calls to the main number are forwarded to the alternative number without ringing the main number. This exclusivity could cause problems when, for example, the subscriber returned to the physical location of the telephone corresponding to the main number, but forgot to deactivate the call forwarding service. Moreover, the conventional call forwarding service was limited to a single alternative telephone number at any one time. When the service is activated, the alternative number is rung, but no further attempts are made to reach the call forwarding service subscriber. So, if the subscriber has moved from the physical location of the telephone to which the call forwarding is directed, the subscriber will not receive the incoming call.

A subsequent attempt was made to provide an improved call forwarding service, wherein the main number and a single alternative number are rung simultaneously. This service was primarily intended to ring a subscriber's cellular telephone, when a calling party attempts to call the subscriber's main wireline (land line) number. This service is implemented largely through the use of a Service Control Point (SCP), but can be difficult to configure and to modify, because the conventional SCP does not have tools for easy configuration and modification of its features. Because the alternative numbers are stored in the SCP, it is expensive to configure the service and to modify the service, once configured. In addition, this service did not enable a call attempt to a cellular telephone to simultaneously ring an associated wireline alternative number. That is, this service did not accommodate setting up a cellular telephone number as a main telephone number with a wireline number as an alternative number.

Therefore, there is a need in the art for an alternative number ringing system that can support the simultaneous ringing of a main number and of multiple alternative numbers associated with the main telephone number and maintained in a call list. The system should enable the main number to be either a wireline number or a wireless (cellular) number. The system also should enable the easy configuration of the call list by a subscriber and should enable the use of multiple call lists.

SUMMARY OF THE INVENTION

An exemplary embodiment of the present invention utilizes a Simultaneous Ring Application that is installed on a Service Control Point (SCP). The Simultaneous Ring Application (SRA) can be implemented as a software and/or hardware application executable by the SCP. The SRA of an exemplary embodiment of the present invention enables the SCP to simultaneously ring a called telephone number and multiple alternative phone numbers associated with the called telephone number. When a calling party makes a call on the calling telephone, a calling Service Switching Point (SSP) contacts the called SSP to attempt to connect the call. When the called SSP receives the notification from the calling SSP that a call attempt is being made to the called telephone, the called SSP can recognize that the call attempt is being made to a subscriber of a simultaneous ring service. The called SSP can fire a predefined trigger to cause the SRA to initiate the simultaneous ring service.

When the SCP detects the firing of the predefined trigger, the SCP determines the called telephone number from a data packet sent by the called SSP over a Signaling System 7 (SS7) data link. The SCP can then access a database to determine the services that apply to the called telephone number and to the fired trigger. The SCP will determine that the Simultaneous Ring Application (SRA) should be invoked to simultaneously ring the called number and at least one alternative number in response to the firing of the trigger.

When the SRA is invoked, the SRA will access a database associated with the SCP to obtain a call list associated with the called telephone number. The SRA will cause a Services Node (SN) to simultaneously place outgoing calls to the called telephone number (the main telephone number) and to each of the alternative telephone numbers in the call list. Advantageously, the main telephone number can be a wireline or a wireless (cellular) telephone number.

The various aspects of the present invention may be more clearly understood and appreciated from a review of the following detailed description of the disclosed embodiments and by reference to the drawings and claims.

DETAILED DESCRIPTION

Figure 1:
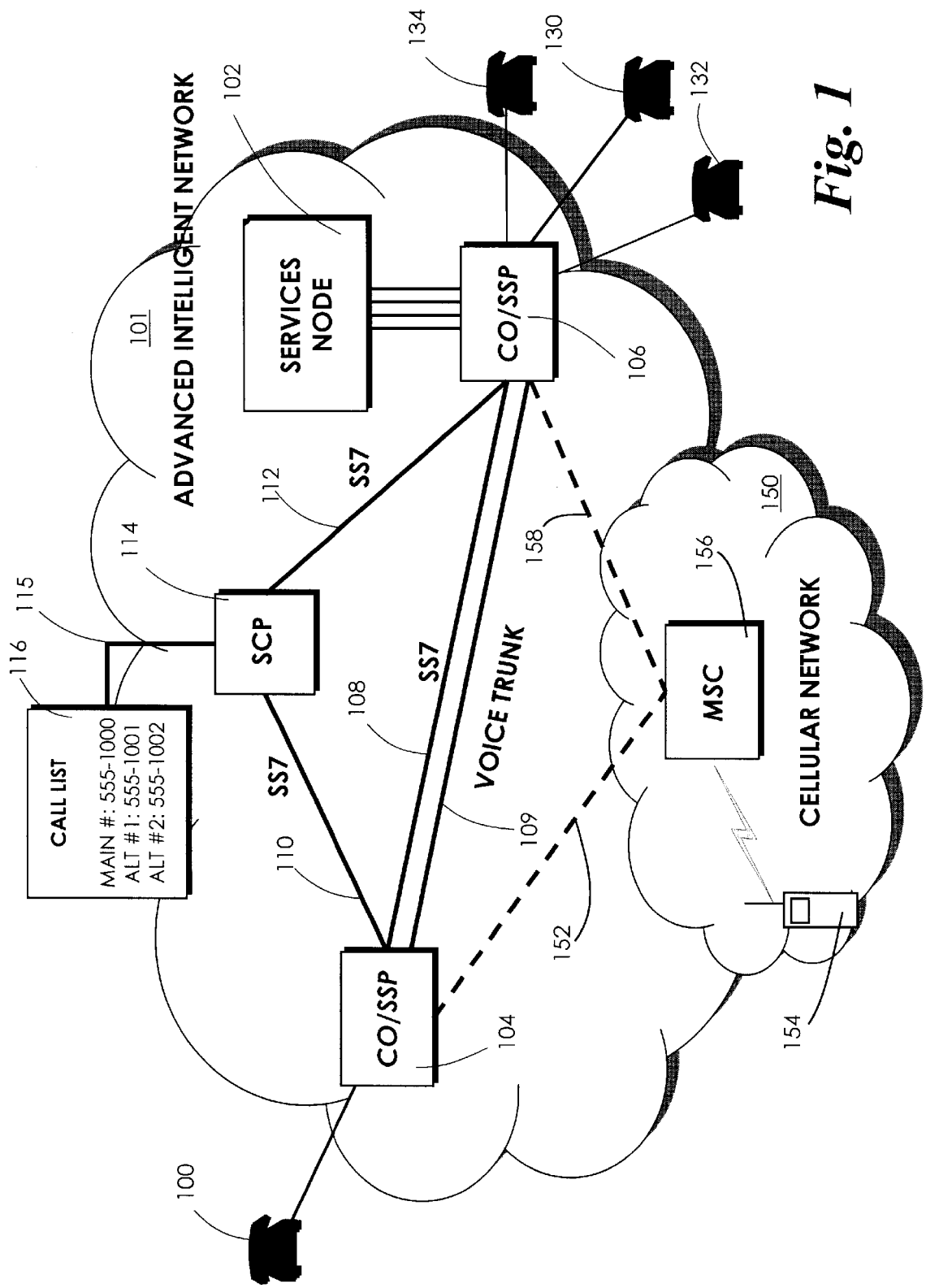
FIG. 1 is a block diagram depicting a conventional simultaneous ring system that operates within a conventional Advanced Intelligent Network.

FIG. 1 is a block diagram depicting a conventional call forwarding system that operates within a conventional Advanced Intelligent Network and a Cellular Telephone Network. Modern telephone switching conforms to a telecommunications protocol referred to as Signaling System 7 (SS7). The AIN 101 is a telecommunications switching network that utilizes the well-known SS7 protocol to connect switching centers and other telecommunications resources to provide call routing and various other services to telephone users. Essentially, the AIN 101 is a collection of telecommunications components and interconnections that supports the generation of AIN messages known as triggers and enables the components to respond to generated triggers by generating responsive messages or by executing an associated instruction.

A conventional voice line telephone 100 is connected to the AIN 101 at a Central Office switch 104. The Central Office switch 104 is also referred to as Service Switching Point (SSP) 104, because of its ability to operate as a switching component of the AIN 101. The Central Office switch 104 will, hereinafter, be referred to as the SSP 104. An SSP 104 may have a plurality of subscriber lines connected thereto, such as a wireline telephone 100. The AIN 101 can have an indefinite number of SSPs 104, 106. The SSPs 104 and 106 communicate with each other over an SS7 protocol data communication link 108 and with other AIN telecommunications components over other SS7 data links 110, 112. Calls can be connected between SSPs 104, 106 over a voice trunk 109. The SS7 data links 108, 110, 112, are used to coordinate the routing of calls and other network functions, while the voice trunk 109 is used to support voice connections between telephones 100, 130, 132, 134.

A conventional Cellular Telephone Network 150 can be integrated as a part of the AIN 101 or as a separate network. The Cellular Telephone Network (CTN) 150 is a network of base stations and switching centers used to establish and maintain a communication connection between a cellular (wireless) telephone 154 and another cellular telephone or wireline telephone. A Mobile Switching Center (MSC) 156 performs most of the switching in the CTN 150 and corresponds to the SSP of the conventional AIN 101. The MSC 156 also can cooperatively communicate with AIN 101 components to, for example, connect calls between a calling telephone and a called cellular telephone 154. The MSC 156 communicates with the SSPs 104, 106 of the AIN 101 over data links 152, 158. Although not shown in FIG. 1, voice connections are supported by voice trunks between AIN components and CTN components.

Much of the intelligence utilized by the AIN 101 to switch calls and provide other telecommunications services resides in a Service Control Point (SCP) 114. As is known to those skilled in the art, SCPs 114 were initially integrated into the AIN 101 to handle message translations and billing transactions for the implementation of 800-number services. An 800 number subscriber has at least one telephone number that can be called by a telephone user. Because there is no physical Central Office or geographic area that corresponds to the 800-area code, it is more economical to provide a few central locations at which a lookup of the directory number for an 800 call can be made, than to provide the requisite translation information at all SSPs 104, 106. SCPs 114 may have associated databases for directory numbers corresponding to functional 800 numbers.

SCPs 114 also may have databases that identify customers that are subscribers to one or more telecommunication services (e.g., caller ID). To maximize the efficiency of processing data and calls at each SSP 104, 106, a relatively small set of triggers are defined for each call and/or service. A trigger in the AIN 101 is an event associated with a particular subscriber line that generates a data packet to be sent to an SCP 114. The trigger causes the SCP 114 to query one or more of its associated databases to determine whether some calling feature or service should be implemented for a particular call. The results of this database query are returned to the SSP 104, 106 from the SCP 114 in a return data packet over an SS7 data link 108, 110, 112.

The return data packet includes instructions to the SSP 104, 106 as to how to process the call. The instructions may be to take some special action as a result of a calling feature or service, or may simply be an indication that there is no entry in the database that indicates that anything other than ordinary telephone switching should be provided for the call. The SCP 114 is a sophisticated, computerized switching system that responds to data packets and/or triggers over the SS7 data links 110, 112 to route calls and to interconnect other telecommunications components and AIN users to provide telecommunications services.

In summary, the AIN 101 is a complex, high-speed, high call volume, packet-switched messaging system that provides a great deal of versatility in the handling of telephone calls between wireline and/or wireless devices. The SSP 104, 106 can generate a trigger in response to the receipt of notification of an incoming call (from another AIN component) and then wait for a response from the SCP 114 before proceeding with call processing. More detailed information regarding the AIN 101 can be found in U.S. Pat. No. 5,430,719, which is commonly assigned to BellSouth Intellectual Property Management Corporation and is incorporated herein by reference.

In the example depicted in FIG. 1, a user of the wireline telephone 100 can ring another wireline telephone 130 by dialing a directory number associated with the telephone 130. A voice link can be created between the calling telephone 100 and the called telephone 130 over the voice trunk 109, if the called telephone 130 is answered in response to the ring. If the called telephone 130 is a subscriber to a conventional simultaneous ring service, a second telephone 132 may be rung in an attempt to connect the calling telephone 100 to a called party associated with the called telephone 130 and with the second telephone 132. Alternatively, a cellular telephone 154 can be simultaneously rung in an attempt to connect the calling party to the called party.

The conventional simultaneous ring system depicted in FIG. 1 is primarily enabled through the coordinated functionality of the SCP 114 (or the MSC 156) and the SN 102. When the SSP 106 associated with the called telephone 130 (the called SSP) receives the call attempt from the SSP 104 associated with the calling telephone 100 (the calling SSP), the called SSP 106 recognizes that the called telephone 130 is a call forwarding service subscriber. The called SSP 106 fires a trigger that causes the SCP 114 to query a database (not shown) to determine whether the called subscriber has the call forwarding service activated. If the SCP 114 determines that the call forwarding service is activated, the SCP will access a call list 116 stored in the database. The SCP 114 will determine from the call list which alternative numbers (if any) are associated with the main number of the called telephone 130. The SCP 114 will then return an instruction to the called SSP 106 to cause the SN 102 to place an outgoing call to the alternative number or to both alternative numbers simultaneously.

Figure 2:
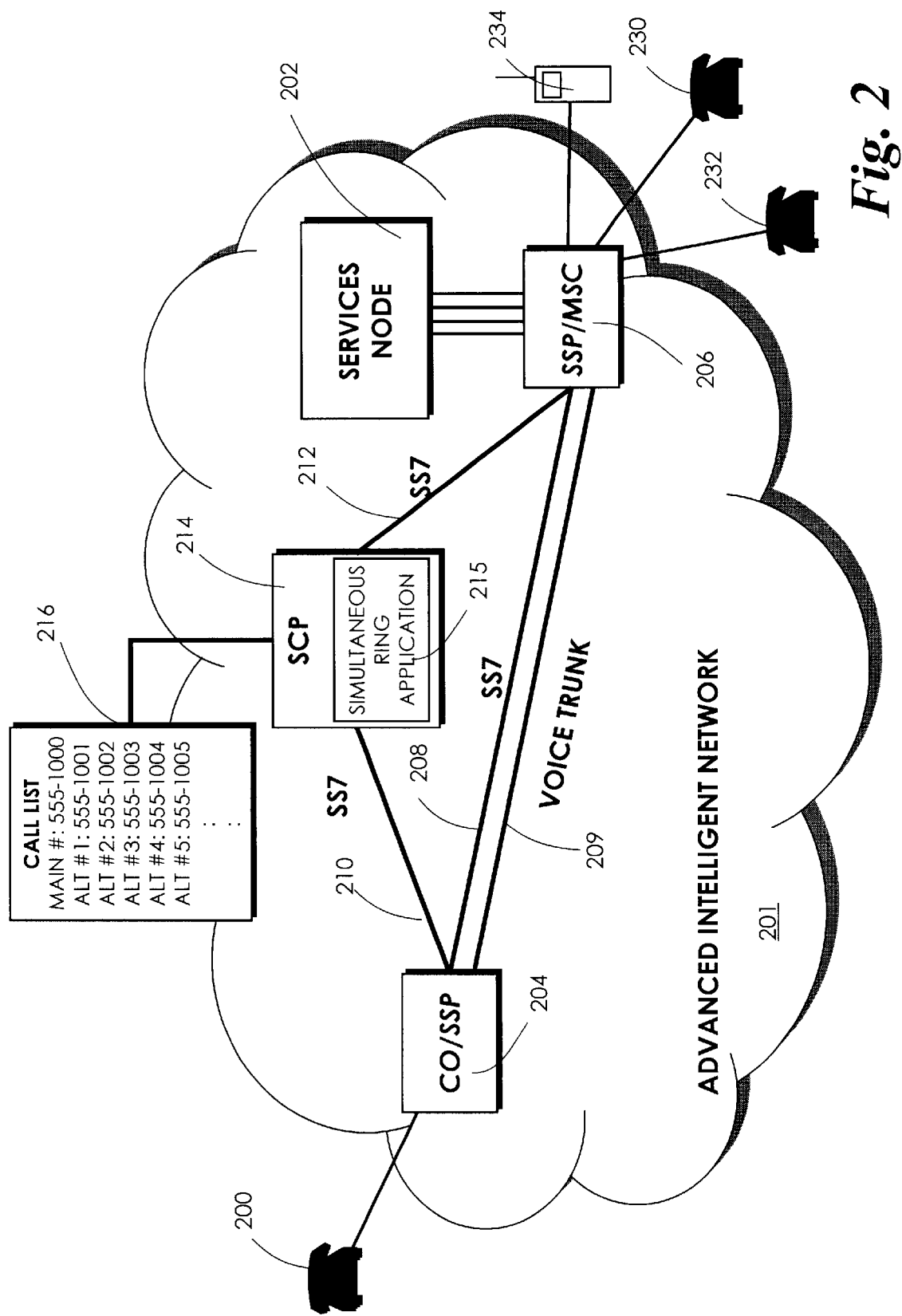
FIG. 2 is a block diagram depicting a simultaneous alternative number ringing system that is an exemplary embodiment of the present invention that operates within a conventional Advanced Intelligent Network.

FIG. 2 is a block diagram depicting a simultaneous alternative number ringing system that is an exemplary embodiment of the present invention that operates within an Advanced Intelligent Network (AIN). The AIN 201 of FIG. 2 includes the network elements to connect a call between a calling telephone 200 and a called telephone 230. Notably, FIGS. 2–4 do not depict distinct components of the cellular telephone system depicted in FIG. 1. For the purposes of this discussion, the SSP 206 is also labeled as an MSC to indicate that the functionality of either network component can be used to implement the described embodiments of the present invention. As described above in connection with FIG. 1, the calling telephone 200 can be used to dial a main telephone number associated with the called telephone 230. The calling SSP 204 will initially process the call attempt by contacting a called SSP 206 associated with the called telephone 230. The calling SSP 204 will contact the called SSP 206 over an SS7 data link 208. The called SSP 206 will ring the called telephone 230 in the conventional manner. If the called telephone 230 is answered, the called SSP 206 will notify the calling SSP 204 that the called telephone 230 has been answered. The calling SSP 204 and the called SSP 206 will cooperate to establish a voice connection over a voice trunk 209. The voice connection will allow a calling party using the calling telephone 200 to conduct a conversation with a called party using the called telephone 230.

The simultaneous alternative number ringing system of FIG. 2 utilizes a Simultaneous Ring Application (SRA) 215 that is installed on the SCP 214. The SRA 215 can be implemented as a software and/or hardware application executable by the SCP 214. The SRA 215 enables the SCP 214 to simultaneously ring alternative phone numbers associated with a called telephone 230.

When a call is placed to a simultaneous ring service subscriber, the called SSP 206 will fire a simultaneous ring trigger that will cause the SCP 214 to invoke the Simultaneous Ring Application (SRA) 215. The SRA 215 will, in turn, access a call list 216 associated with the subscriber's (i.e., called party's) account and will determine whether any alternative numbers have been identified for simultaneous ringing. If an alternative number has been identified for simultaneous ringing, the SRA 215 will retrieve the alternative number from the call list 216. The SRA 215 will package the alternative number as an AIN message that will be transmitted by the SCP 214 to the called SSP 206. The called SSP 206 will then cause the Services Node (SN) 202 to simultaneously place out-bound calls to the alternative number and to the main number (called number). Those skilled in the art will appreciate that this embodiment of the present invention could be utilized to place multiple out-bound calls to multiple alternative numbers retrieved from the call list 216.

When a calling party makes a call on the calling telephone 200, the calling SSP 204 contacts the called SSP 206 to attempt to connect the call, as described above. When the called SSP 206 receives the notification from the calling SSP 204 that a call attempt is being made to the called telephone 230, the called SSP 206 can recognize that the call attempt is being made to a subscriber of a simultaneous ring service. Consequently, the called SSP 206 can set triggers that will fire in certain conditions. Those skilled in the art will appreciate that various triggers could be used to indicate the existence of various network conditions. A Mobile Switching Center (MSC) can be configured to fire similar triggers in the context of a Cellular Telephone Network.

If the calling telephone 200 had placed a call to a cellular telephone 234, the call would first be routed to a called MSC 206. The called MSC 206 can be equipped with triggers analogous to the simultaneous ring trigger used in the SSP. If the called cellular telephone 234 belongs to a simultaneous ring subscriber, the MSC 206 will fire the simultaneous ring trigger and the SCP 214 will invoke the SRA 215, as described above, to retrieve alternative numbers from a call list. The SCP 214 will return a message to the MSC 206, causing the SN 202 to place out-bound calls to the telephones 230, 232 associated with the alternative telephone numbers, as well as to the cellular telephone 234 associated with the main telephone number.

When a telephone 230, 232, 234 associated with an alternative number is answered, the SN 202 will cease ringing all other alternative numbers. Typically, the SSP/MSC 206 is notified when a called telephone is answered. When the SSP/MSC 206 determines that a telephone associated with a simultaneous ring service subscriber has been answered, the SSP/MSC 206 can determine whether other another alternative number is being rung. If another number is being rung, the SSP/MSC 206 can cause the SN 202 to terminate the call attempt to the alternative number. Thus, any unnecessary simultaneous ringing can be stopped.

Figure 3:
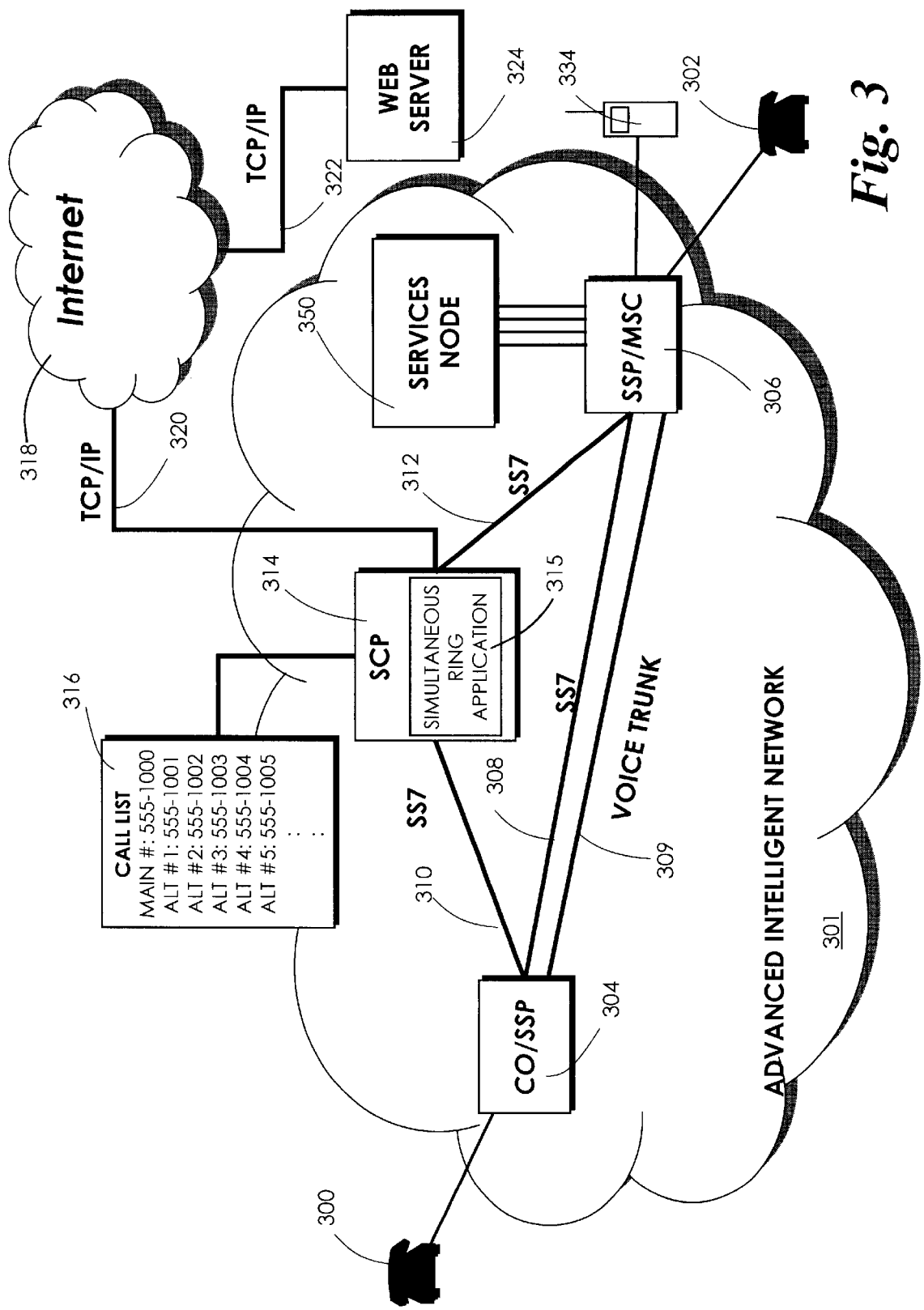
FIG. 3 is a block diagram depicting a simultaneous alternative number ringing system that is an alternative embodiment of the present invention that operates within a conventional Advanced Intelligent Network.

FIG. 3 is a block diagram depicting a simultaneous alternative number ringing system that is an alternative embodiment of the present invention. The simultaneous alternative number ringing system of FIG. 3 includes an SRA 315 running on an SCP 314. The SRA is responsive to a simultaneous ring trigger fired by a called SSP 306 when a calling party telephone 300 attempts to make a call to called party telephone 302 and to an alternative number telephone 334. The SRA 315 will cause a Services Node 350 to make an out-bound call to the main (called) telephone number and to any alternative number telephones associated with the main telephone number. When a call can be completed between the calling party telephone 300 and the called party telephone 302 (or the alternative number telephone 334), the calling SSP 304 will communicate with the called SSP 306 over the SS7 data link 308 to set up a voice connection over a voice trunk 309 and the call attempt to the alternative telephone will be ended.

The SRA 315 depicted in FIG. 3 has added functionality as compared with the SRA 215 depicted in FIG. 2. The SRA 315 permits the creation and modification of a call list 316 through a third party entity, such as web server 324. For example, the web server 324 could be connected to the SCP 314 via the Internet 318 or other Internet Protocol (IP) network. The web server 324 could be connected by TCP/IP (Transmission Control Protocol/Internet Protocol) data links 320, 322 to the SCP 314. The SRA 315 could process instructions received from the web server 324 to create and modify a call list 316 stored in the SCP 314 or in a database associated with the SCP. Similarly, the SRA 315 could provide call list information to the web server 324 over such a network connection. For example, the web server 324 could query the SRA 315 to obtain raw call list data or the SRA 315 could be configured to produce formatted call lists data, such as in HTML-formatted web pages.

The system of FIG. 3 enables a user (e.g., a simultaneous ring service subscriber) or other third party to access the web server 324 through the Internet 318. The user may be required to log into a web site hosted by the web server 324 and to produce authorization credentials. Once authorized, the user can create and/or modify a call list 316 for which the user has provided proper authorization credentials. This functionality also can, for example, be used for enabling and disabling the simultaneous ring service. Those skilled in the art will appreciate that enabling network access to the SCP 314 and the SRA 315 could be used for various advantageous purposes within the scope of the present invention. Those skilled in the art will appreciate that various security measures could be taken to ensure the privacy and integrity of a subscriber's call list.

Figure 4:
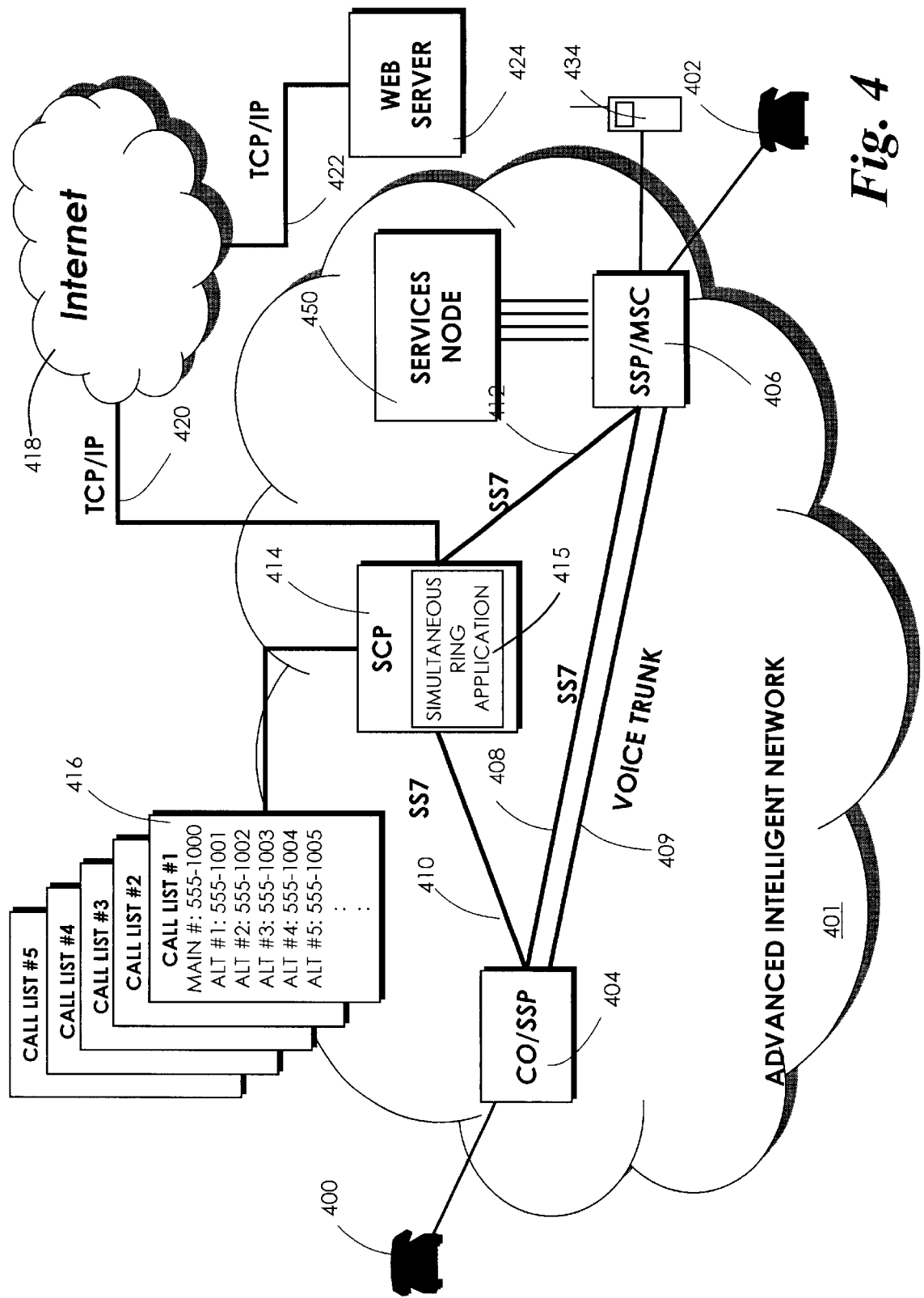
FIG. 4 is a block diagram depicting a simultaneous alternative number ringing system that is another alternative embodiment of the present invention that operates within a conventional Advanced Intelligent Network.

FIG. 4 is block diagram depicting a simultaneous alternative number ringing system that is another alternative embodiment of the present invention. As with the simultaneous alternative number ringing systems described in connection with FIGS. 2 and 3, the SCP 414 of FIG. 4 provides a platform for an SRA 415. The SRA 415 is responsive to a simultaneous ring trigger fired by a called SSP/MSC 406 and received by the host SCP 414 over SS7 data link 412. However, the SRA 415 of FIG. 4 also accommodates the use of multiple call lists 416.

The multiple call lists 416 can be associated with a single main telephone number corresponding to a called telephone 402. However, one or more call lists may be selectively active at any given time. The SRA 415 can be configured to automatically determine whether a call list 416 is enabled or disabled. Advantageously, third party access through a web server 424 can be employed to permit the manual selection of enabled and disabled call lists 416 or the creation of rules that govern the automatic determination of enabled and disabled call lists.

Accordingly, a user can create a variety of call lists to be used in various conditions. The user may, for example, create a workday call list, a weekend call list, and a vacation day call list. A call list may be appropriate for a particular situation, based on various factors, for example, the number of alternative telephone numbers included in a particular call list 416.

The SRA 415 may be configured by the user or someone else to automatically determine which call list is an applicable. For example, a first call list may be applicable during work hours, while another call list is applicable during evening hours. In addition, the call lists may be selected based on the identity of a calling party. If, for example, the sequence ring subscriber's spouse is calling, a more extensive call list 416 may be employed than when an unknown party (i.e., unidentified) is attempting to call the subscriber. The SRA 415 can obtain caller identification information that is made available to the SCP 414 over the SS7 data links in the conventional manner.

Figure 5:
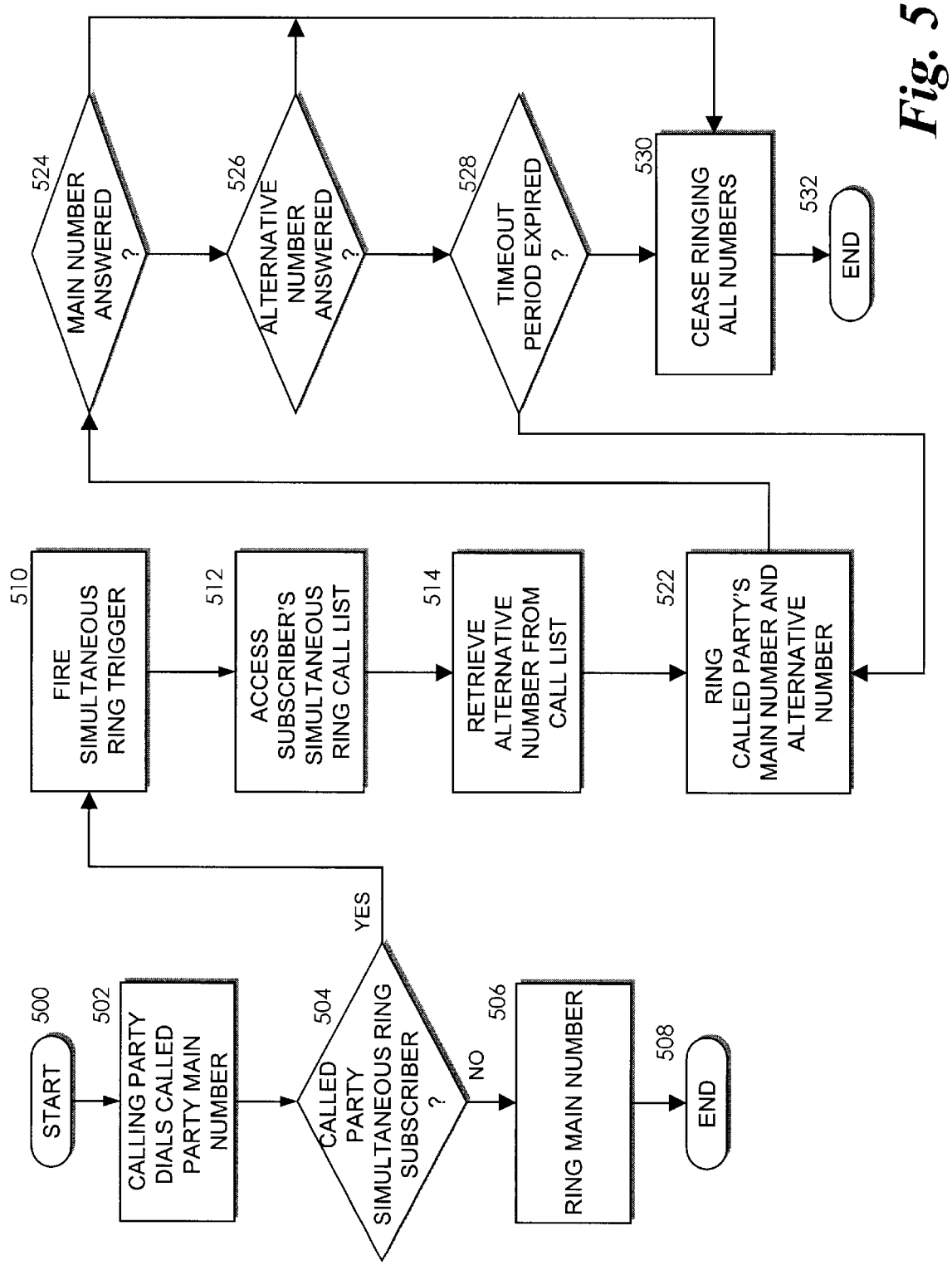
FIG. 5 is a flow chart depicting an exemplary method for simultaneously ringing alternative numbers associated with a called party's main number.

FIG. 5 is a flow chart depicting an exemplary method for simultaneously ringing alternative telephone numbers associated with a called party's main number. The method begins at start block 500 and proceeds to step 502, the calling party dials the main number of the called party. The method proceeds to decision block 504, wherein a determination is made as to whether the called party is a subscriber to the simultaneous ring service. If the called party is not a subscriber, the method branches to step 506 and the main number is rung in the conventional manner. The method proceeds from step 506 to step 508 and ends.

If, at decision block 504, a determination is made that the called party is a simultaneous ring subscriber, the method branches to step 510. At step 510, a simultaneous ring trigger is fired. As described in connection with FIGS. 2–4, this step can be performed by a called SSP or a called MSC associated with the main number of the called party. The method proceeds from step 510 to step 512, wherein the subscriber's simultaneous ring call list is accessed. As described above, this step can be preformed by the SRA in cooperation with an SCP. Typically, the SCP will invoke the SRA in response to recognizing the firing of the simultaneous ring trigger.

The method then proceeds to step 514, wherein an alternative number is retrieved from the call list. Those skilled in the art will appreciate that this could be a single alternative number or multiple alternative numbers. In one embodiment of the present invention, the simultaneous ring service could be disabled by removing all alternative numbers from the call list. In that embodiment, the absence of any alternative numbers would indicate that only the main number should be rung.

The method proceeds from step 514 to step 522 and the called party's main number and any retrieved alternative numbers are simultaneously rung. The method then proceeds to decision block 524. At decision block 524, a determination is made as to whether the main number is answered. If the main number is answered, then the method branches to step 530. If, on the other hand, the main number is not answered, the method branches to decision block 526. At decision block 526, a determination is made as to whether the alternative number is answered. If the alternative number is answered, the method branches to step 530. If, on the other hand, the alternative number is not answered, the method branches to decision block 528.

At decision block 528, a determination is made as to whether a time out period has expired. The time out period can be used to avoid the continual ringing of the main number and any alternative numbers. Of course, other conventional techniques can be used to avoid continual ringing, such as a local and/or global voicemail system set to respond to a predefined number of rings. If, at decision block 528, a determination is made that the time out period has expired, the method branches to step 530. If a determination is made at decision block 528, that the time out period has not expired, then the method loops back to step 522 and the main number and alternative numbers will be rung until one is answered, or the time out period expires.

At step 530, the main number and the alternative numbers will cease being rung. Step 530 is reached when a telephone associated with either the main number or one of the alternative numbers is answered. Step 530 is also reached when none of the telephones associated with the main number and the alternative numbers has been answered, despite having been rung for the duration of the time out period.

Accordingly, the method of FIG. 5 will attempt to connect a calling party to a called party's main telephone number and/or to an alternative telephone number. If the called party is a simultaneous ring subscriber, the method will access a call list and simultaneously ring the main number and each of the alternative telephone numbers included in the call list. When a successful connection is made, the method will cease ringing all of the numbers. On the other hand, when a call attempt cannot be completed, the method will cease ringing all of the numbers, following the expiration of a time out period.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A simultaneous number ringing system for ringing a first alternative number associated with a main number, comprising:

a Service Control Point (SCP) within an Advanced Intelligent Network (AN), the SCP having a simultaneous ring application (SRA) resident thereon; and a first call list associated with the main number and containing the first alternative number, the first call list being stored within the AN;

a Service Switching Point (SSP), within the AIN, operative to receive the main number from a calling subscriber and operative to fire a simultaneous trigger in response to a determination that a call attempt has been made to the main number and wherein the SRA is operative to retrieve the first alternative number from the first call list and to cause a Services Node (SN) within the AIN to place a first out-bound call attempt to the main number and a second out-bound call attempt to the first alternative number, in response to a determination that the simultaneous ring trigger has been fired and wherein the main number is a conventional directory number.

2. The simultaneous number ringing system of claim 1, further comprising a second call list associated with the main number and containing a second alternative number wherein the SRA is further operative to retrieve the second alternative number from the second call list and to cause a SN within the AIN to place one of the second out-bound call and a third out-bound call to the second alternative number.

3. The simultaneous number ringing system of claim 1, wherein the first call list contains a second alternative number.

4. The simultaneous number ringing system of claim 3, wherein the SRA is operative to cause the SN to cease ringing the main number and to cease ringing the first alternative number, in response to a determination that a telephone associated with the first alternative number is answered.

5. The simultaneous number ringing system of claim 3, wherein the SRA is operative to cause the SN to cease ringing the main number and to cease ringing the first alternative number, in response to a determination that a telephone associated with the main number is answered.

6. The simultaneous number ringing system of claim 1, wherein the first call list can be modified through a remote access point.

7. The simultaneous number ringing system of claim 6, wherein the remote access point is a web site hosted by a web server.

8. The simultaneous number ringing system of claim 1, wherein the main number is associated with a cellular telephone.

9. The simultaneous number ringing system of claim 8, wherein the first alternative number is associated with a wireline telephone.

10. The simultaneous number ringing system of claim 1, wherein the first alternative number is associated with a cellular telephone.

11. A method for using a Service Control Point (SCP) to ring an alternative number associated with a main number, the method comprising the steps of:

receiving a call attempt to the main number;

causing the SCP to determine a first alternative number from a first call list associated with the main number, wherein the SCP and the first call list are within an Advanced Intelligent Network (AIN);

causing the SCP to simultaneously ring a telephone associated with the first alternative number and a telephone associated with the main number, and causing the SCP to cease ringing the first alternative number, in response to a determination that the telephone associated with the main number is answered, wherein the step of causing the SCP to simultaneously ring a telephone associated with the first alternative number and a telephone associated with the main number comprises the steps of:

causing a Services Node (SN) to place an out-bound call to the main number; and causing the SN to place an out-bound call to the first alternative number.

12. A computer readable medium having stored thereon computer-executable instructions for performing the method of claim 11.

13. The method of claim 11, further comprising the step of causing the SCP to determine a second alternative number from a second call list associated with the main number.

14. The method of claim 13, further comprising the step of causing the SCP to simultaneously ring the telephone associated with the main number and simultaneously ring at least one of a telephone associated with the second alternative number and the telephone associated with the first alternative number.

15. The method of claim 11, further comprising the step of permitting third party access to the first call list through a remote access point.

16. The method of claim 15, further comprising the step of permitting the first call list to be modified through the remote access point.

17. The method of claim 15, further comprising the step of permitting a second call list to be created through the remote access point.

18. The method of claim 15, wherein the remote access point is a web site hosted by a web server.

19. A method for ringing an alternative number associated with a main number, the method comprising the steps of:

receiving a call attempt directed to the main number;

causing a Service Switching Point (SSP) within an Advanced Intelligent Network (AIN) to fire a simultaneous ring trigger, in response to receiving the call attempt;

causing a Service Control Point (SCP) within an Advanced Intelligent Network (AIN) to retrieve the alternative number from a call list associated with the main number, in response to the firing of the simultaneous ring trigger;

causing a Services Node (SN) to place an out-bound call to the main number;

causing the SN to place an out-bound call to the alternative number;

causing the SSP to simultaneously ring the main number and the alternative number; causing the SSP to cease ringing the alternative number, in response to a determination that the main number is answered; and causing the SSP to cease ringing the main number, in response to a determination that the main number is answered.

20. The simultaneous number ringing system of claim 2, wherein one of the second out-bound call and the third out-bound call to the second alternative number is placed by the SN within the AN in response to determining at least one of the following:

the call attempt is made on a predetermined day of the week;

the call attempt is made at a predetermined hour of the day;

the call attempt is made by a predetermined calling party; and the first call list has been disabled.

* * * * *